(12) United States Patent
Maira et al.

(10) Patent No.: US 11,841,340 B2
(45) Date of Patent: Dec. 12, 2023

(54) INTERFACE ELECTRONIC DEVICE FOR READING AN OUTPUT SIGNAL AND FOR CONTROLLING AND CONDITIONING A THREE-ELECTRODES AMPEROMETRIC SENSOR

(71) Applicant: DISTRETTO TECNOLOGICO SICILIA MICRO E NANO SISTEMI S.C.A.R.L., Catania (IT)

(72) Inventors: Giovanni Maira, Catania (IT); Luigi Occhipinti, Catania (IT); Bruno Giuseppe Pignataro, Catania (IT); Vincenzo Vinciguerra, Catania (IT)

(73) Assignee: DISTRETTO TECNOLOGICO SICILIA MICRO E NANO SISTEMI S.C.A.R.L., Catania (IT)

( * ) Notice: Subject to any disclaimer, the term of this patent is extended or adjusted under 35 U.S.C. 154(b) by 480 days.

(21) Appl. No.: 16/977,694

(22) PCT Filed: Feb. 27, 2019

(86) PCT No.: PCT/IB2019/051565
§ 371 (c)(1),
(2) Date: Sep. 2, 2020

(87) PCT Pub. No.: WO2019/166964
PCT Pub. Date: Sep. 6, 2019

(65) Prior Publication Data
US 2021/0041391 A1    Feb. 11, 2021

(30) Foreign Application Priority Data

Mar. 2, 2018    (IT) .................... 102018000003236

(51) Int. Cl.
*G01N 27/327*    (2006.01)

(52) U.S. Cl.
CPC ................... *G01N 27/3273* (2013.01)

(58) Field of Classification Search
None
See application file for complete search history.

(56) References Cited

U.S. PATENT DOCUMENTS

| 7,663,357 B2 | 2/2010 | Chung |
| 2010/0066378 A1 | 3/2010 | Ahmadi |

OTHER PUBLICATIONS

International Search Report issued for PCT/IB2019/051565, dated Jun. 14, 2019 (4 pages).

(Continued)

*Primary Examiner* — J. Christopher Ball
(74) *Attorney, Agent, or Firm* — ArentFox Schiff LLP (57) ABSTRACT

Electronic devices and methods for reading an output signal and controlling a three-electrode electro-chemical amperometric sensor include an operational amplifier having a non-inverting input adapted to receive a biasing electric potential and an inverting input connectable to a reference electrode of the sensor. The devices further include one or more MOS transistors connected to the operational amplifier, with a first MOS transistor connectable to the collector electrode of the sensor to receive or supply a MOS transistor channel current representative of the cell current generated in the sensor, and a second MOS transistor connectable to a reference voltage by a conductor or a resistor. The resistance is lower than the cell impedance such that the current in the second MOS transistor channel depends on the current in the first MOS transistor channel through a nonlinear gain dependent on the resistor.

15 Claims, 8 Drawing Sheets

(56) References Cited

OTHER PUBLICATIONS

Written Opinion of the International Searching Authority issued for PCT/IB2019/051565, dated Jun. 14, 2019 (9 pages).
Sohn, Ki-Sung et al.; "A Unified Potentiostat for Electrochemical Glucose Sensors"; Transactions on Electrical and Electronic Materials, vol. 14, No. 5, Oct. 25, 2013 (Oct. 25, 2013), pp. 273-277.
Ahmadi M M et al.; "Current-Mirror-Based Potentiostats for Three-Electrode Amperometric Electrochemical Sensors"; IEEE Transactions on Circuits and Systems-I: Regular Papers, vol. 56, No. 7, Jul. 1, 2009, pp. 1339-1348.
Lu, Congyan et al.; "Progress in flexible organic thin-film transistors and integrated circuits"; Science Bulletin, vol. 61, No. 14, Jun. 28, 2016, pp. 1081-1096.

INTERFACE ELECTRONIC DEVICE FOR READING AN OUTPUT SIGNAL AND FOR CONTROLLING AND CONDITIONING A THREE-ELECTRODES AMPEROMETRIC SENSOR

TECHNOLOGICAL BACKGROUND OF THE INVENTION

Cross-Reference to Related Applications

This application is the U.S. National Stage Application of PCT Patent Application No. PCT/IB2019/051565, filed on Feb. 27, 2019, which claims priority to Italian Patent Application No. 102018000003236, filed on Mar. 2, 2018, the contents of each of which is incorporated herein by reference in its entirety.

Application Field

The present invention generally relates to the technical field of electronic devices for reading signals from sensors.

In particular, the invention relates to a device, a circuit diagram and a method for reading an output signal and controlling an electro-chemical amperometric sensor.

Description of the Prior Art

It is known to use electro-chemical amperometric sensors, or three-electrode sensors, capable of determining the concentration of a chemical substance (analyte) by measuring the current which is determined in the electrolytic cell following oxidation or reduction reactions which take place at the electrodes.

Figure 1A:
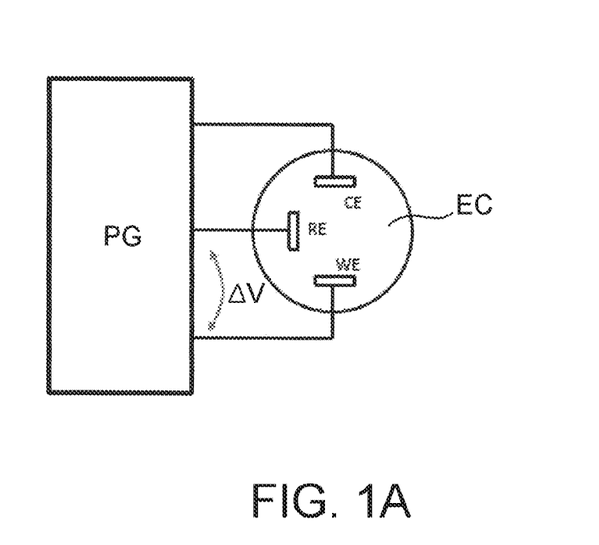
FIG. 1A shows a known system comprising a potentiostat and a three-electrode amperometric sensor.

More specifically, as shown in FIG. 1A, the electrochemical cell EC comprises a working electrode WE, at which the oxidation or reduction reaction takes place, maintained at a stable and known potential with respect to a reference electrode RE, and a collector electrode CE adapted to collect charge carriers.

For cell operation, a stable potential $\Delta V$ (electrical cell potential) must be applied between the working electrode WE and the reference electrode RE. An electric current is generated due to reactions, at the working electrode WE, of oxidation or reduction of a chemical substance (analyte) present in a solution contained in the cell. If the analyte loses electrons, there is an oxidation and a consequent oxidation current which flows from the working electrode WE to the collector electrode CE (while the electrons perform an opposite movement). If the analyte acquires electrons, there is a reduction and a consequent reduction current flowing from the collector electrode CE to the working electrode WE (while the electrons perform an opposite movement).

Figure 1B:
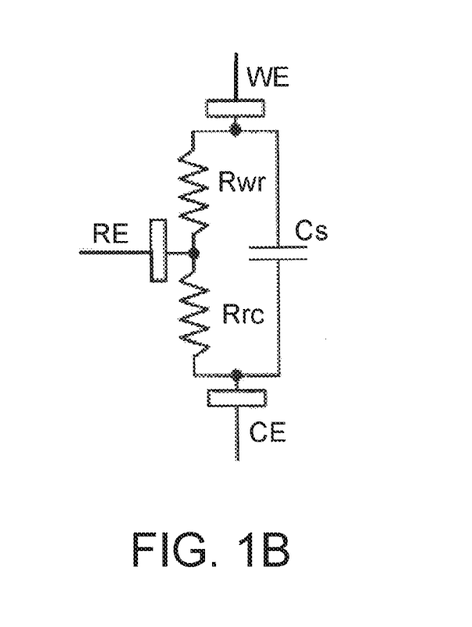
FIG. 1B shows a simplified electrical diagram of the three-electrode amperometric sensor (Randles model)

A well-known equivalent electric model of the electrochemical cell is shown in FIG. 1B (Randles model). In this model, there is an equivalent resistance Rwr between the working electrode WE and the reference electrode RE, there is an equivalent resistance Rrc between the electrode collector CE and the reference electrode RE, while between the working electrode WE and the collector electrode CE there is an impedance Zcw given by the parallel between a capacitance Cs and the series of the aforementioned resistances Rwr and Rrc.

The intensity of the reduction or oxidation current that is generated in the cell, called Faraday or faradic current, is proportional to the concentration of the analyte, according to a proportionality factor defined in a known manner by the chemical substance, the type of solution and the type of reaction.

In order to use the electrochemical sensor, it is necessary to have equipment which can read the Faraday current and at the same time can ensure the maintenance of a constant potential difference $\Delta V$ between the reference electrode RE and the working electrode WE.

In a laboratory environment, a potentiostat-galvanostat PG (shown in FIG. 1A) can be used for this purpose. However, the need is generally felt to have more compact and less expensive electronic devices capable of performing the same functions as the potentiostat-galvanostat.

Figure 2:
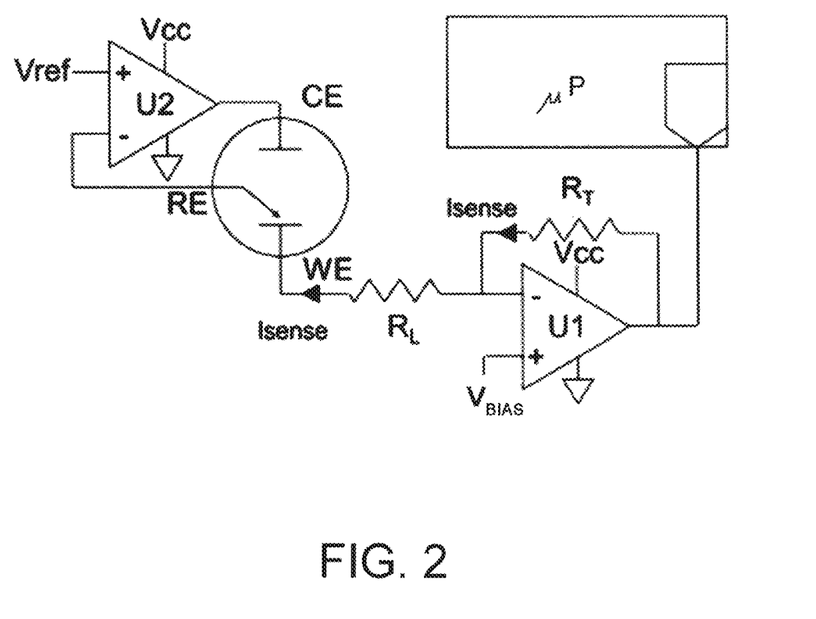
FIG. 2 shows a diagram of a known apparatus for controlling and conditioning and reading the output signals of the three-electrode amperometric sensor.

In this regard, circuits operating according to the principle and the electrical scheme shown in FIG. 2 are known. These circuits are characterized by a first operational amplifier U1 which ensures that the working electrode WE is grounded or is constrained to a known potential. In this way, it is necessary to simply detect the voltage of the reference electrode RE, in synergy with an input biasing voltage $V_{BIAS}$ which depends on the chemical reaction taking place in the sensor. The error of the potential set on the reference electrode RE, due to the reaction, is a signal which is amplified by a second operational amplifier U2 (potentiostat) and supplied in feedback to control the collector electrode CE which will supply a current which will tend to cancel the aforementioned error. In the example shown in FIG. 2, the Faraday current signal $I_{sense}$ is converted into a voltage signal after passing through the resistor $R_T$, with U1 acting as trans-impedance amplifier. The circuit in FIG. 2 is controlled by a microprocessor µP.

The known circuit disclosed above has some drawbacks. For example, it requires a double power supply and suffers from a high energy consumption due to the presence of several (at least two) operational amplifiers. Furthermore, the voltage on the working electrode WE is not stable due to the further resistance $R_L$, placed between the working electrode WE and the inverting input of the operational amplifier U1. In this case, when the frequency increases, the voltage increases accordingly.

Other known solutions, alternative to that shown in FIG. 2, provide for amperometric sensor output signal reading circuits comprising a plurality of MOS transistors, and operating on the basis of the current mirror principle. These circuits, however, may suffer from the further drawback of having a high equivalent input impedance, measured by the collector electrode CE, which causes oscillations and instability of the circuit for low current values.

Further known solutions still provide that the Faraday current is converted into an output current through a current mirror diagram, but allow to obtain a low equivalent input impedance, measured by the collector electrode CE: this is obtained by using, in the circuit, both P-MOS transistors and N-MOS transistors.

However, the fact of necessarily requiring, in the same circuit, both P-MOS transistors and N-MOS transistors, in addition to operational amplifiers, constitutes a serious drawback: for example, this makes it necessary to use a BiCMOS-type technology, excluding other possible and desirable technologies in this field.

Moreover, in such circuits using a current mirror, the operating dynamic range (range of measurable current values) is characterized in that the gain between the Faraday current and the output current is substantially constant: small currents are amplified as much as large currents. Furthermore, the structure of the circuit does not offer degrees of freedom for a project adaptable to different types of electrochemical sensors, which can have very different operating dynamic ranges, not always linear.

In view of the aforementioned features of the prior art, the need is therefore felt to make available electronic devices/ circuits for reading an output signal and controlling/conditioning an electrochemical sensor which are as simple as possible, cost-effective, of limited dimensions allowing the use of advantageous technologies (for example Organic Thin Film Transistors—OTFT) and at the same time exhibit a versatile structure, able to read currents within a wide range of values and therefore easily adaptable to a wide range of sensors.

SUMMARY OF THE INVENTION

It is the object of the present to provide an electronic device for reading an output signal and controlling and conditioning a three-electrode electro-chemical amperometric sensor, which allows to at least partially overcome the drawbacks mentioned above with reference to the prior art, and to meet the aforementioned requirements particularly felt in the technical field considered.

Such an object is achieved by a device according to claim 1.

Further embodiments of such a circuit are defined by claims 2-5.

The present invention also relates to a method of reading an output signal of a three-electrode amperometric sensor. Such a method is defined in claim 6.

Further embodiments of the method are defined by claims 7-9.

The present invention also relates to a system for measuring a concentration of electrolytes, using the device according to the invention. Such a system is defined in claim 10.

A further embodiment of the system is defined by claim 11.

BRIEF DESCRIPTION OF THE DRAWINGS

Further features and advantages of such a method and system according to the invention will become apparent from the following description of preferred exemplary embodiments, given by way of a non-limiting example with reference to the accompanying drawings, in which.

DETAILED DESCRIPTION

Figure 3:
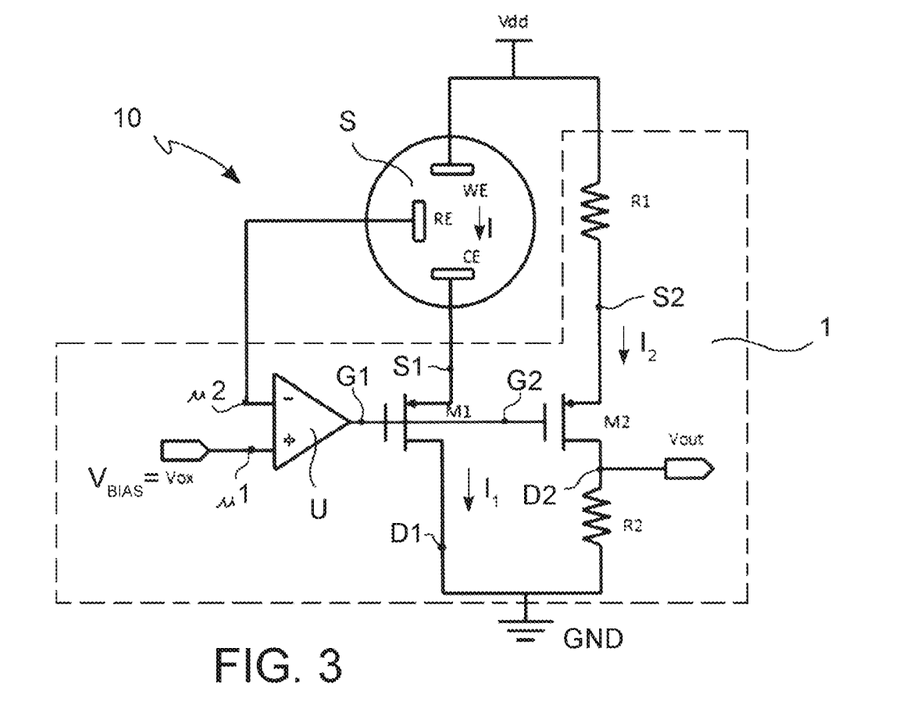
FIG. 3 shows a circuit diagram comprising a three-electrode amperometric sensor and an electronic device for reading an output signal and controlling and conditioning such a sensor, according to an embodiment of the present invention, applicable to the case of oxidation currents.
Figure 4:
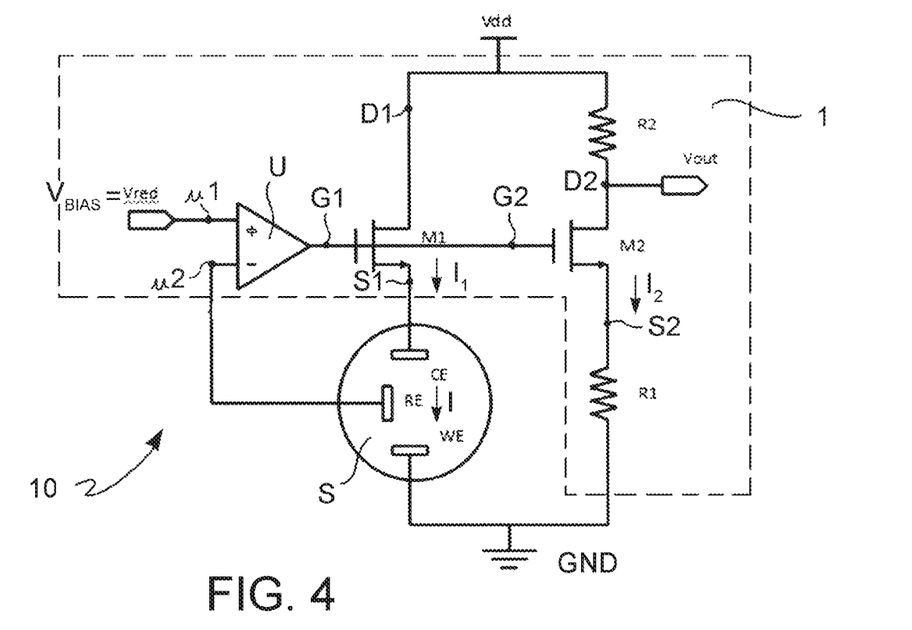
FIG. 4 shows a circuit diagram comprising a three-electrode amperometric sensor and an electronic device for reading an output signal and controlling and conditioning such a sensor, according to a further embodiment of the present invention, which can be applied to the case of reduction currents.

With reference to FIGS. 3 and 4, an electronic device 1 for reading an output signal and controlling a three-electrode electrochemical amperometric sensor S is now described.

In FIGS. 3 and 4, the device 1 is enclosed by a dashed line, and interacts with the larger system for measuring an electrolyte concentration 10, which also comprises, in addition to the device 1, also the sensor S which is controlled and conditioned by the device 1.

In particular, but not limited to, the definition of "electronic device" applies herein to a circuit structure capable of reading the output signal and controlling the aforesaid amperometric sensor.

It should be noted that such a circuit structure may be implemented by means of the most diverse implementation options, in terms of integrated or discrete technology, and in terms of partition of the device components (which may be non-integrated, or integrated with each other, or partly integrated with the sensor and partly integrated separately, and so on). The term "electronic device" should therefore be understood in a non-limiting manner with reference to the above.

More particularly, but not limited to, the electronic device described herein is an interfacing circuit for reading an output signal and for controlling and conditioning the aforesaid amperometric sensor. In this case, the amperometric sensor control also comprises the conditioning of the sensor itself, by means of suitable electrical input signals, and is therefore essential for the operation of the sensor itself.

The device may be used with an electro-chemical amperometric sensor comprising a three-electrode amperometric sensor S having a reference electrode RE configured to supply a constant cell electric potential to an electrochemical cell of the sensor; a working electrode WE at which oxidation or reduction reactions occur, connectable to a first reference voltage; and a collector electrode CE configured to deliver or receive electric charge carriers. In the electrochemical cell, a cell impedance Zcw is considered, which can model the electrical behavior between the working electrode WE and the collector electrode CE.

The device 1 comprises an operational amplifier U, having a non-inverting input u1, adapted to receive a biasing electric potential $V_{BIAS}$ dependent on the type of electro-chemical reaction of the sensor, and an inverting input U2, connectable to the reference electrode RE of the sensor S. The operational amplifier U is adapted to operate in a feedback configuration to supply the above constant cell electrical potential, measured with respect to the potential, maintained fixed, to the reference electrode RE according to the biasing electric potential $V_{BIAS}$.

The device 1 further comprises a first MOS transistor M1, having a first MOS gate terminal G1 connected to the output of the operational amplifier U, a first MOS drain terminal D1, connectable to a second reference voltage, and a first MOS source terminal S1, connectable to the collector electrode CE of the sensor to receive or supply a first MOS transistor channel current $I_1$ representative of the cell current I which is generated in the amperometric sensor S.

The device 1 further comprises a second MOS transistor M2 having a second MOS gate terminal G2 connected to the output of the operational amplifier U and to the aforementioned first MOS gate terminal G1, a second MOS source terminal S2, connectable to a first reference voltage by means of a conductor or a first resistor R1 of the device, and a second MOS drain terminal D2, operatively connectable to the second reference voltage.

The value of the first resistance R1 is lower than the cell impedance Zcw (and, more specifically, lower than or equal to real part of the cell impedance Zcw) so that the second MOS transistor channel current $I_2$ depends on the first MOS transistor channel current $I_1$, which is representative of the cell current I of the sensor S, through a nonlinear gain dependent on the value of the first resistor R1.

The second MOS transistor M2 is of the same type as the first MOS transistor M1.

It should be noted that, in the device structure defined above, the channel current $I_1$ of the first MOS transistor is not merely mirrored on the output branch, but a non-linear gain and a current offset are introduced, adjustable during the design step by dimensioning of the resistance R1 with respect to the cell impedance.

In particular, the fact that the resistance R1 is dimensioned so as to be lower than the real part of the cell impedance Zcw (present, in the parallel branch, between the reference voltage and the source terminal S1 of the first MOS transistor) ensures that the voltage between source and gate $V_{SG-2}$ of the second MOS transistor M2 is always greater than the voltage between source and gate $V_{SG-1}$ of the first MOS transistor M1, so that the output current $I_2$, on the second branch, is greater than the cell current flowing through the first branch. This implies, among other things, the presence of an offset current on the second branch even for a zero cell current.

Figure 5:
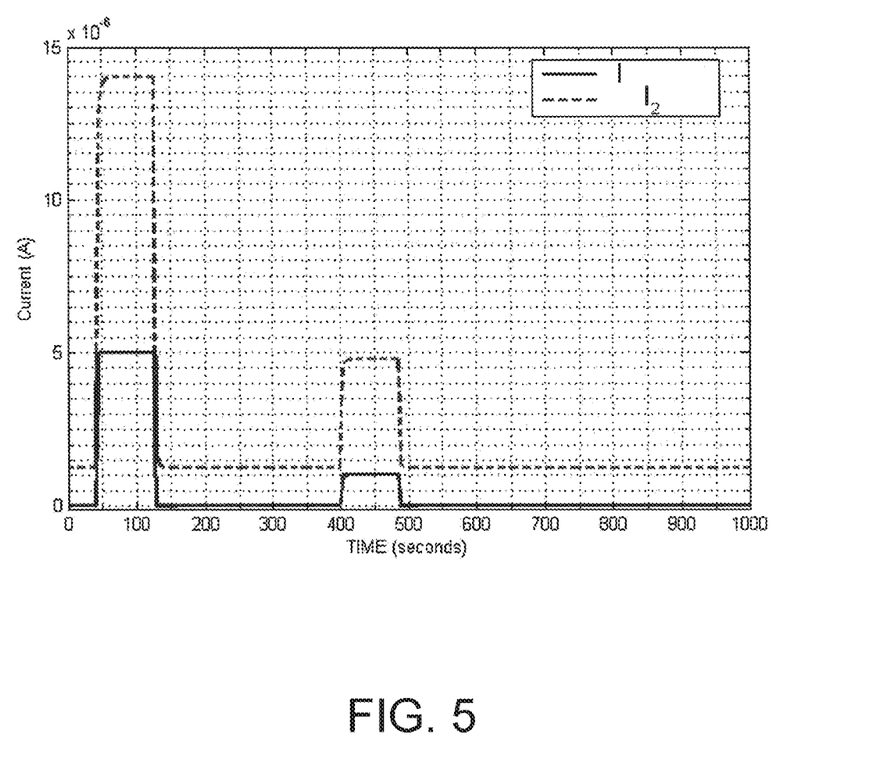
FIG. 5 shows results of computer simulations carried out on the device according to the invention.

The behavior described above is illustrated by the simulation results shown in FIG. 5 (in which the output current $I_2$ is indicated by a dashed line and the cell current I is indicated by a solid line; it is also assumed that R2=50 kΩ).

By virtue of the features outlined above, small cell currents can be effectively detected (for example, in the purely exemplary case of a glucose sensor, a few µA currents), which are greatly amplified, and at the same time high cell currents (for example, in the purely exemplary case of a glucose sensor, currents of some tens of µA), which are amplified less, through the non-linear gain, so as not to cause saturation in the output. Thus, the operating dynamic range of the device is considerably improved.

According to a dimensioning implementation example, the source terminal of second MOS S2 may be directly connectable to the first reference voltage, i.e., in other words, the resistance R1 may have a substantially zero value.

According to an implementation option of the device 1, the channel current of the first MOS transistor $I_1$ is equal to the cell current I of the amperometric sensor S. Furthermore, the second MOS drain terminal D2 is connected to the second reference voltage by means of a second resistance R2, and the electric voltage Vout present at the second MOS drain terminal D2 is representative of the cell current I of the amperometric sensor S through a non-linear gain depending on the value of the first resistance R1 and of the second resistance R2, with a voltage offset also present in case of zero cell current.

More specifically, the electric voltage Vout present at the circuit output (i.e., at the second MOS drain terminal D2) is proportional to the channel current $I_2$ of the second MOS transistor through a proportionality constant given by the second resistance R2. In turn, the channel current $I_2$ of the second MOS transistor is correlated to the channel current $I_1$ of the first MOS transistor, which is in this case equal to the cell current I, through a non-linear gain depending on the value of the first resistance R1.

As noted above, in the implementation option defined above, the channel current of the first MOS transistor is converted into an output voltage through the resistance R2. In addition to the previously mentioned advantages of a wide operating dynamic range, such an implementation allows a further degree of freedom, i.e., the ratio between the values of the resistances R1 and R2, to define the gain in a variable manner, in the design step, depending on the application needs. The versatility of use of the device is thus improved.

According to an embodiment of the device, shown in FIG. 3, both the first and the second MOS transistors (M1, M2) are of the P-MOS type; the first reference voltage is a positive supply voltage Vdd; the second reference voltage is a ground voltage GND; the electric polarization potential $V_{BIAS}$ is an oxidation potential Vox. In this case, the device 1 is configured to read an oxidation current I flowing in the amperometric sensor S from the working electrode WE, at which oxidation reactions occur, to the collector electrode CE.

In this case, applicable for example to blood glucose sensors, electrons move in solution up to the working electrode WE, to support the oxidation reaction, so that the electric oxidation current flows from the working electrode WE to the collector electrode CE. The role of the reference electrode RE is to establish a stable potential in the electrochemical cell. The potential set at the reference electrode RE is a potential along the potential axis through which the oxidizing or reducing power of the working electrode is evaluated. No current flows through the reference electrode RE. The constant potential difference ΔV between the working electrode WE and the reference electrode RE is ensured by the operational amplifier, to the non-inverting input of which a well-known oxidation potential Vox is applied, measured with respect to the WE potential (fixed in this case to a reference voltage Vdd) and dependent on the particular reaction taking place in the sensor.

When the oxidation reaction occurs, electrons tend to concentrate around the working electrode WE, the impedance of the solution tends to change, the difference in the cell electric potential ΔV tends to reduce, and the potential of the reference electrode RE tends to increase. Consequently, the output potential of the operational amplifier immediately tends to decrease, and therefore the voltage between source and gate $V_{sg1}$ of the first transistor increases, which causes an increase in the channel current of the first transistor, i.e., an increase in the current which flows through the collector electrode CE. This reduces the trend of excess of electrons at the working electrode WE, thus restoring and maintaining all the potential and current values at the stable operating level of the cell. The channel current flowing between the drain and source terminals of the first transistor is therefore equal to the cell current, which is proportional in a known manner with respect to the concentration of the analyte in solution that the sensor must detect.

According to another embodiment of the device, shown in FIG. 4, both the first and the second MOS transistors (M1, M2) are of the N-MOS type; the first reference voltage is a ground voltage GND; the second reference voltage is a positive supply voltage Vdd; the electric polarization potential $V_{BIAS}$ is a reduction potential Vred.

In this case, the device is configured to read a reduction current flowing in the amperometric sensor from the collector electrode CE to the working electrode WE, at which reduction reactions occur.

The operation of the circuit in FIG. 4 is exactly similar, mutatis mutandis, to the operation of the circuit in FIG. 3 which has been described above in detail.

Again with reference to FIGS. 3 and 4, a system 10 for measuring of a concentration of electrolytes is now described. The system 10 comprises a three-electrode electrochemical amperometric sensor S and an electronic device 1, according to any one of the embodiments disclosed above, for reading an output signal and controlling a three-electrode amperometric sensor.

The electrochemical amperometric sensor S comprises three electrodes: a reference electrode RE configured to supply a constant cell electric potential to the electrochemical cell; a working electrode WE at which oxidation or reduction reactions occur, connectable to a first reference voltage; and lastly a collector electrode CE configured to deliver or receive electric charge carriers.

According to a particular embodiment of the system, the first and second MOS transistors (M1, M2) and the first and second resistances (R1, R2) of the device 1 are implemented by technologies different than silicon-based technologies (for example, by Organic Thin Film Transistors—OTFT technology) and are also integrated to (or incorporated in) the amperometric sensor S.

A method for reading an output and control signal of an electro-chemical amperometric sensor S is now described, wherein the amperometric sensor S comprises three electrodes: a reference electrode RE configured to supply a constant cell electric potential to an electrochemical cell of the sensor; a working electrode WE at which oxidation or reduction reactions occur; and lastly, a collector electrode CE configured to deliver or receive electric charge carriers. The electro-chemical cell has (i.e., is characterized by) a cell impedance Zcw between the working electrode WE and the collector electrode CE.

The method comprises the steps of connecting the working electrode WE to a first reference voltage; connecting a source terminal S1 of a first MOS transistor M1 to the collector electrode CE of the sensor S for receiving or supplying a first MOS transistor channel current $I_1$ representative of the cell current I generated by the amperometric sensor; connecting a drain terminal D1 of the first MOS transistor M1 to a second reference voltage; connecting a gate terminal G1 of the first MOS transistor M1 to the output of an operational amplifier U.

The method further provides the steps of providing a non-inverting input u1 of the aforesaid operational amplifier U with a biasing electric potential $V_{BIAS}$ based on the type of electrochemical reaction of the sensor; then, connecting an inverting input u2 of the operational amplifier U to the reference electrode RE of the sensor S, so as to operate the operational amplifier U in a feedback configuration through an equivalent variable impedance Rrc present between the collector electrode CE and the reference electrode RE, and to supply the constant cell electric potential dependent on the biasing electric potential $V_{BIAS}$ to the reference electrode RE.

It should be noted that the constant cell electric potential is measured between the working electrode WE (which is at a known set potential, i.e., at the first reference voltage) and the reference electrode RE.

The method then provides for connecting a gate terminal G2 of a second MOS transistor M2 to the output of the operational amplifier U and to the gate terminal G1 of the first MOS transistor M1; connecting a drain terminal D2 of the second MOS transistor M2 to the second reference voltage; connecting a source terminal S2 of the second MOS transistor M2 to the first reference voltage by means of a conductor or a first resistance R1, having a value lower than the cell impedance Zcw (and, more specifically, lower than or equal to the real part of the cell impedance Zcw), so that the channel current of the second MOS transistor $I_2$ depends on the channel current of the first MOS transistor representative of the cell current I of the sensor, through a non-linear gain dependent at least on the value of the first resistance R1.

Lastly, the method provides for determining the cell current I of the sensor S based on the second MOS transistor current channel $I_2$.

In the method described, the first MOS transistor M1 and the second MOS transistor M2 are of the same type.

According to an implementation option of the method, the step of connecting the drain terminal D2 of the second MOS transistor M2 comprises connecting the drain terminal D2 of the second MOS transistor M2 to the second reference voltage by means of a second resistor R2.

The step of determining the cell current I comprises detecting the electric voltage Vout present at the drain terminal of the second MOS transistor D2, which is representative of the cell current I of the sensor through a nonlinear gain dependent on the value of the first resistor R1 and on the value of the second resistor R2, with a voltage offset present also in the case of zero cell current.

According to an embodiment of the method, both the first and the second MOS transistors (M1, M2) are of the P-MOS type; the first reference voltage is a positive supply voltage Vdd; the second reference voltage is a ground voltage GND; the electric polarization potential $V_{BIAS}$ is an oxidation potential Vox.

In this case, the step of determining the cell current I of the sensor comprises detecting an oxidation current flowing in the amperometric sensor S from the working electrode WE, at which oxidation reactions occur, to the collector electrode CE.

According to another embodiment of the method, both the first and the second MOS transistors (M1, M2) are of the N-MOS type; the first reference voltage is a ground voltage GND; the second reference voltage is a positive supply voltage Vdd; the electric polarization potential $V_{BIAS}$ is a reduction potential Vred.

In this case, the step of determining the cell current I of the sensor comprises detecting a reduction current flowing in the amperometric sensor S from the collector electrode CE to the working electrode WE, at which oxidation reactions occur.

The relationship between the output current (or voltage) of the device and the cell current—or the relationship between the channel current of the second MOS transistor and the channel current of the first MOS transistor—may be determined through computerized simulations or through an experimental characterization of the device.

Figure 6A:
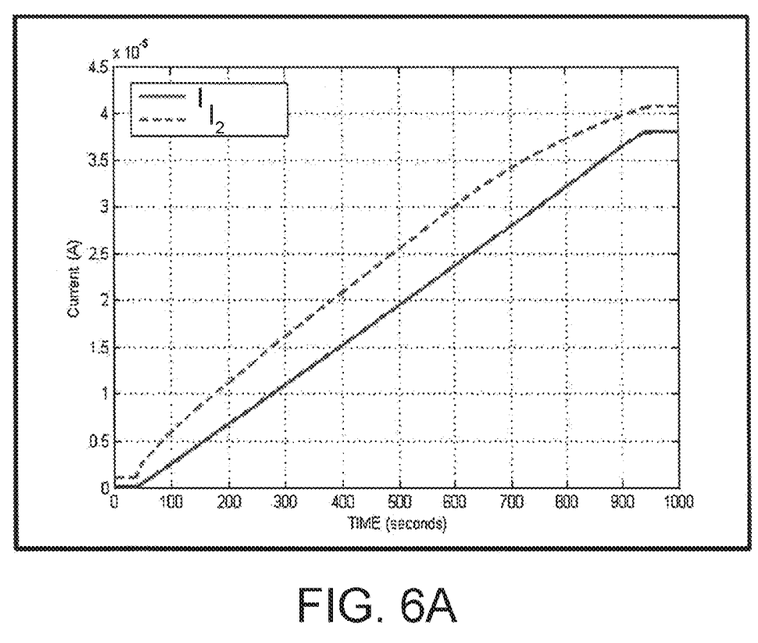
FIGS. 6A, 6B, 6C and 6D show respective cases of correlation between cell current and output current of the device, corresponding to different implementation options with different settings of the device parameters.
Figure 6B:
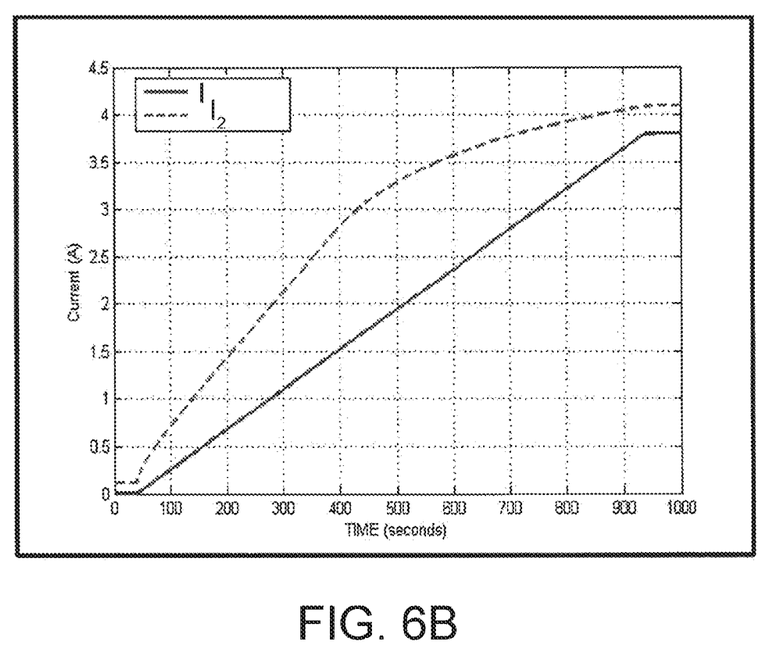
Figure 6C:
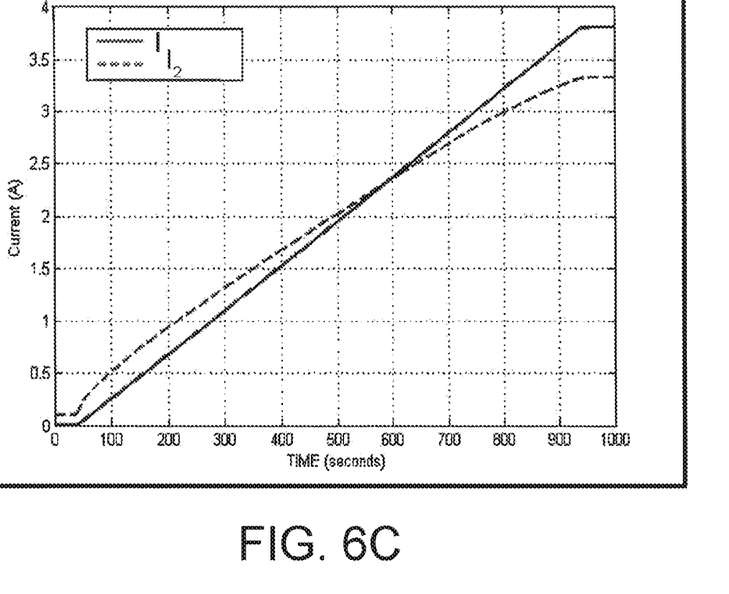
Figure 6D:
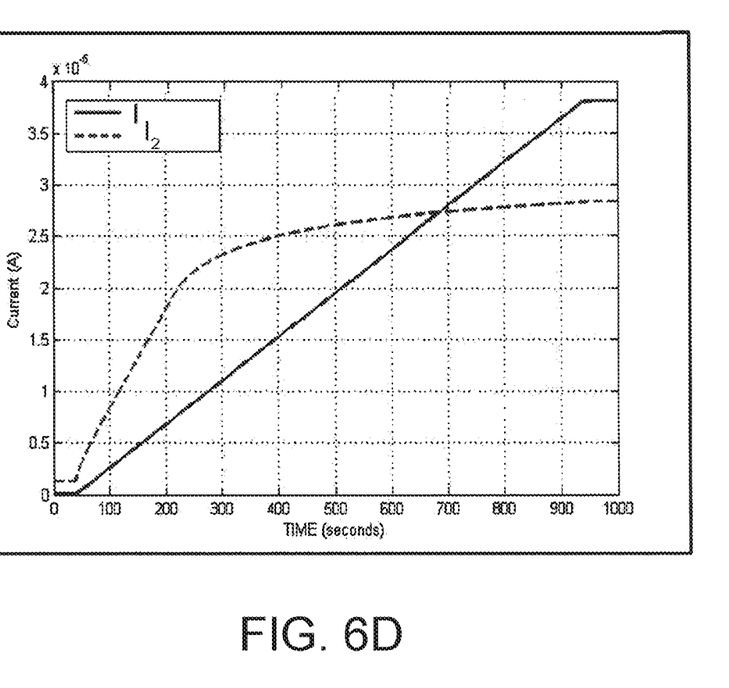

FIGS. 6A to 6D show the results of simulations carried out by setting different values for the resistances R1 and R2. In particular, the diagrams are obtained based on the following values:

FIG. 6A: R1=25 kΩ; R2=25 kΩ;
FIG. 6B: R1=10 kΩ; R2=50 kΩ;
FIG. 6C: R1=40 kΩ; R2=20 kΩ;
FIG. 6D: R1=0 kΩ; R2=100 kΩ.

In all the aforementioned FIGS. 6A-6D, the output current $I_2$ is indicated by a dashed line and the cell current I is indicated by a solid line.

In all cases, as can be seen in the figures, each current cell value corresponds uniquely and deterministically to an output current value. At the same time, the relationship between these two quantities, and therefore the shape of the curves and the respective trend in time (reported in abscissa, in seconds), varies with the aforementioned parameters, thus allowing the circuit to be adapted, in the design step, to different types of applications.

In order to verify the results of the simulations, experimental results were also obtained relating to a prototype of the embodiment of the device shown in FIG. 4. This prototype was made using a TSZ121 operational amplifier and P-MOS STR2P3LLH6 transistors from STMicroelectronics. Resistors R1 and R2 were chosen with values of 46 ohms and 100 ohms, respectively. The prototype was tested with an amperometric glucose sensor based on the enzyme Glucose Oxidase (GOx).

Figure 7A:
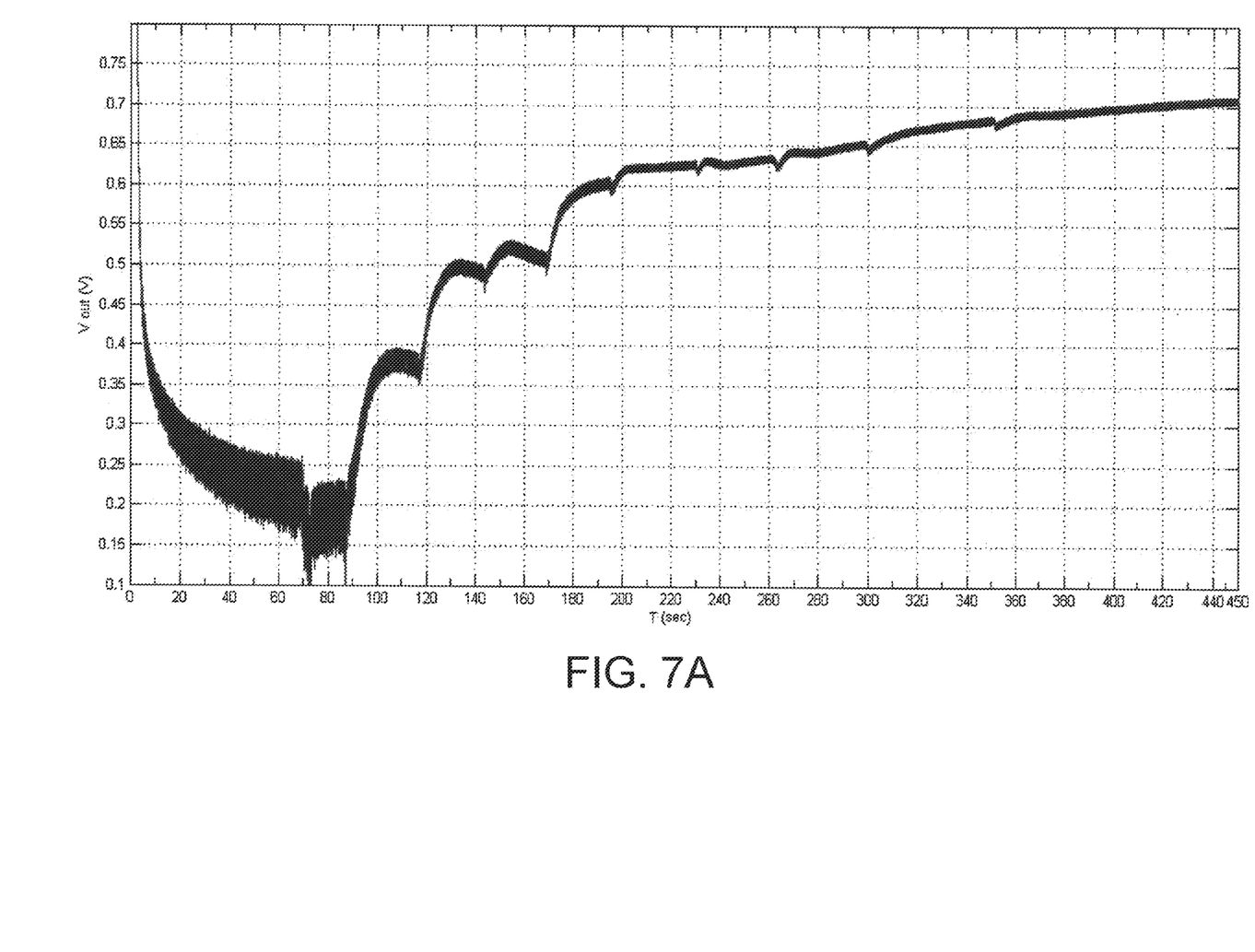
FIGS. 7A and 7B show experimental results comparing the operation of the device of the present invention (FIG. 7A) and the operation of a known potentiostat-galvanostat (FIG. 7B).
Figure 7B:
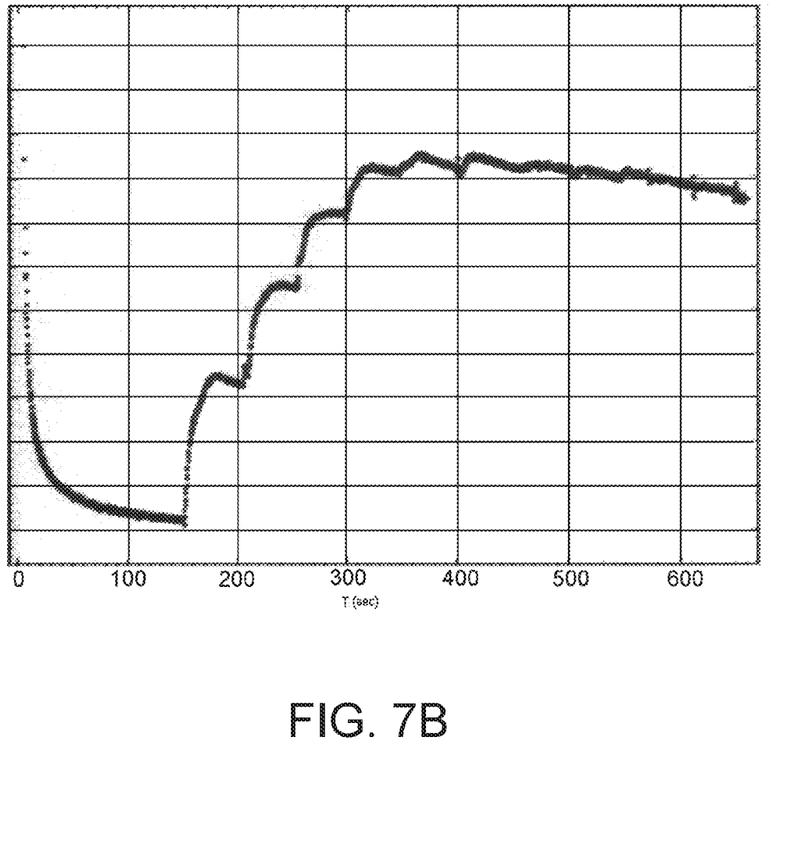

FIGS. 7A and 7B respectively show the results of measurements of output voltages as a function of time, obtained by using the sensor prototype of the present device and a potentiostat-galvanostat for reading the results of the sensor. The results obtained show a satisfactory matching correspondence.

As can be seen, the object of the present invention is fully achieved by the device described above, by virtue of the functional and structural features thereof.

In fact, the device according to the invention corresponds to a simple circuit scheme, which allows to design compact and cost-effective devices and systems.

Moreover, in each of the embodiments, the device comprises a single type of MOS transistors (either N-MOS only or P-MOS only).

This feature, in turn, allows great versatility in designing a "sensor—interface circuit" system, in which, for example, transistors (of a single type) and resistances may be implemented in technologies (for example, OTFT) different than the silicon-based technologies and may be advantageously incorporated in the electrochemical sensor. Moreover, the device according to the invention has a versatile structure, capable of reading currents within a wide range of values, and is easily adaptable to a wide range of sensors.

In particular, due to the non-linear gain and the current offset ensured by the circuit structure of the device, some degrees of freedom in the operating dynamics are introduced which allow versatility of use with respect to electrochemical sensors based on different reactions and in different operating steps.

Moreover, the gain, the offset and generally the trend of the output current (or voltage) with respect to the cell current may be adjusted in the design step, taking advantage of the degrees of freedom of dimensioning offered by the structure of the device, so to optimize the circuit performance to a wide variety of uses.

Lastly, the stability of the device is improved, especially in the presence of small currents to be detected, due to the fact that the equivalent input impedance, seen from the collector electrode CE, is low.

Similar advantages can be identified with reference to the method comprised in the invention described above.

Those skilled in the art may make several changes, adjustments, adaptations, and replacements of elements with others which are functionally equivalent, to the embodiments of the device, system and method according to the invention in order to meet incidental needs, without departing from the scope of the following claims. Each of the features described as belonging to a possible embodiment can be obtained irrespective of the other embodiments described.

The invention claimed is:

1. An electronic device for reading an output signal and controlling a three-electrode electro-chemical amperometric sensor (S) having a reference electrode (RE) configured to supply a constant cell electric potential to an electrochemical cell of the sensor, a working electrode (WE) at which oxidation or reduction reactions occur, connectable to a first reference voltage, and a collector electrode (CE) configured to either deliver or receive electric charge carriers, the electrochemical cell having a cell impedance (Zcw) between the working electrode (WE) and the collector electrode (CE), wherein the device comprises:

an operational amplifier (U), having a non-inverting input (u1), adapted to receive a biasing electric potential ($V_{BIAS}$) dependent on the type of electrochemical reaction of the sensor, and an inverting input (U2), connectable to the reference electrode (RE) of the sensor (S), the operational amplifier (U) being adapted to operate in a feedback configuration to supply said constant cell electrical potential to the reference electrode (RE) according to the biasing electric potential ($V_{BIAS}$);

a first MOS transistor (M1), having a first MOS gate terminal (G1) connected to the output of the operational amplifier (U), a first MOS drain terminal (D1), connectable to a second reference voltage, and a first MOS source terminal (S1), connectable to the collector electrode (CE) of the sensor to receive or supply a first MOS transistor channel current (I1) representative of the cell current (I) which is generated in the amperometric sensor (S);

a second MOS transistor (M2) having a second MOS gate terminal (G2) connected to the output of the operational amplifier (U) and to said first MOS gate terminal (G1), a second MOS source terminal (S2), connectable to a first reference voltage by means of a conductor, having a very low or substantially zero conductor resistance, or by means of a first resistor (R1) of the device, and a second MOS drain terminal (D2), operatively connectable to the second reference voltage, wherein the value of said conductor resistance or of said first resistor (R1) is lower than the cell impedance (Zcw) so that the second MOS transistor channel current ($I_2$) depends on the first MOS transistor channel current ($I_1$), which is representative of the cell current (I) of the amperometric sensor (S), through a nonlinear gain dependent on the value of the first resistor (R1) or of the conductor resistance, and wherein the second MOS transistor (M2) is of the same type as the first MOS transistor (M1).

2. The electronic device according to claim 1 wherein:

the first MOS transistor channel current ($I_1$) is equal to the cell current (I) of the amperometric sensor (S);

the second MOS drain terminal (D2) is connectable to the second reference voltage by means of a second resistor (R2); and the electrical voltage (Vout) present at the second MOS drain terminal (D2) is representative of the cell current (I) of the amperometric sensor (S) through a nonlinear gain dependent on the value of the first resistor (R1) and on the value of the second resistor (R2), with a voltage offset present also in the case of zero cell current.

3. The electronic device according to claim 1, wherein:
both the first (M1) and the second (M2) MOS transistors are of the P-MOS type;
the first reference voltage is a positive supply voltage (Vdd);
the second reference voltage is a ground voltage (GND);
the biasing electric potential ($V_{BIAS}$) is an oxidation potential (Vox); and
the electronic device is configured to read an oxidation current (I) flowing in the amperometric sensor from the working electrode (WE), at which oxidation reactions occur, to the collector electrode (CE).

4. The electronic device according to claim 1, wherein:
both the first (M1) and the second (M2) MOS transistors are of the N-MOS type;
the first reference voltage is a ground voltage (GND);
the second reference voltage is a positive supply voltage (Vdd);
the biasing electric potential ($V_{BIAS}$) is a reduction potential (Vred); and
the electronic device is configured to read a reduction current (I) flowing in the amperometric sensor from the collector electrode (CE) to the working electrode (WE), at which reduction reactions occur.

5. The electronic device according to claim 1, wherein the first resistor as a substantially zero value.

6. A method for reading an output signal and controlling a three-electrodes electro-chemical amperometric sensor (S) having a reference electrode (RE) configured to supply a constant cell electric potential to an electrochemical cell of the sensor, a working electrode (WE) at which oxidation or reduction reactions occur, connectable to a first reference voltage, and a collector electrode (CE) configured to either deliver or receive electric charge carriers, the electrochemical cell having a cell impedance (Zcw) between the working electrode (WE) and the collector electrode (CE), wherein the method comprises the steps of:
connecting the working electrode (WE) to a first reference voltage;
connecting a source terminal (S1) of a first MOS transistor (M1) to the collector electrode (CE) of the sensor (S) to either receive or supply a first MOS transistor channel current ($I_1$) representative of a cell current (I) which is generated in the amperometric sensor (S);
connecting a drain terminal (D1) of the first MOS transistor (M1) to a second reference voltage;
connecting a gate terminal (G1) of the first MOS transistor (M1) to an operational amplifier (U);
supplying a biasing electric potential ($V_{BIAS}$) to a non-inverting input (u1) of the operational amplifier (U) on the basis of the type of electrochemical reaction of the sensor;
connecting an inverting input (u2) of the operational amplifier (U) to the reference electrode (RE) of the sensor (S), so as to operate the operational amplifier (U) in a feedback configuration through an equivalent impedance (Rrc) present between the collector electrode (CE) and the reference electrode (RE), and to supply the constant cell electric potential dependent on the biasing electric potential ($V_{BIAS}$) to the reference electrode (RE);
connecting a gate terminal (G2) of a second MOS transistor (M2) to the output of the operational amplifier (U) and to the gate terminal (G1) of the first MOS transistor (M1);
connecting a drain terminal (D2) of the second MOS transistor (M2) to the second reference voltage;
connecting a source terminal (S2) of the second MOS transistor (M2) to the first reference voltage by means of a conductor, having a very low or substantially zero conductor resistance, or by means of a first resistor (R1), wherein the value of said conductor resistance or of said first resistor (R1) is lower than the cell impedance (Zcw), so that the second MOS transistor channel current ($I_2$) depends on the first MOS transistor channel current ($I_1$), which is representative of the cell current (I) of the amperometric sensor (S), through a nonlinear gain dependent on the value of the first resistor (R1) or of the conductor resistance;
determining the cell current (I) of the sensor (S) based on the second MOS transistor current channel ($I_2$);
wherein the first MOS transistor (M1) and the second MOS transistor (M2) are of the same type.

7. The method according to claim 6, wherein the first MOS transistor channel current ($I_1$) is equal to the cell current (I) of the amperometric sensor (S), and wherein;
the step of connecting the drain terminal of the second MOS transistor comprises connecting the drain terminal (D2) of the second MOS transistor (M2) to the second reference voltage by means of a second resistor (R2); and
the step of determining the cell current (I) comprises detecting the electric voltage (Vout) present at the drain terminal (D2) of the second MOS transistor (M2), which is representative of the cell current (I) of the sensor (S) through a nonlinear gain dependent on the value of the first resistor (R1) and on the value of the second resistor (R2), with a voltage offset present also in the case of zero cell current.

8. The method according to claim 6, wherein:
both the first (M1) and the second (M2) MOS transistors are of the P-MOS type;
the first reference voltage is a positive supply voltage (Vdd);
the second reference voltage is a ground voltage (GND);
the biasing electric potential (VBIAS) is an oxidation potential (Vox); and
the step of determining the cell current of the sensor comprises detecting an oxidation current (I) flowing in the amperometric sensor from the working electrode (WE), at which oxidation reactions occur, to the collector electrode (CE).

9. The method according to claim 6, wherein:
both the first (M1) and the second (M2) MOS transistors are of the N-MOS type;
the first reference voltage is a ground voltage (GND);
the second reference voltage is a positive supply voltage (Vdd);
the biasing electric potential ($V_{BIAS}$) is a reduction potential (Vred); and
the step of determining the cell current of the sensor comprises detecting a reduction current (I) flowing in the amperometric sensor from the collector electrode (CE) to the working electrode (WE), at which oxidation reactions occur.

10. A system for measuring a concentration of electrolytes comprising:
a three-electrodes amperometric sensor (S) having a reference electrode (RE) configured to supply a constant cell electric potential to an electrochemical cell of the sensor, a working electrode (WE) at which oxidation or reduction reactions occur, connectable to a first reference voltage, and a collector electrode (CE) configured to deliver or receive electric charge carriers;

an electronic device for reading an output signal and controlling a three-electrodes amperometric, according to claim 1.

11. A system according to claim 10, wherein:
the first MOS transistor (M1), the second MOS transistor (M2), the first resistor (R1) and the second resistor (R2) of the electronic device are made using technologies other than silicon-based technology and, furthermore, are integrated with the amperometric sensor (S).

12. A system according to claim 10, wherein:
the first MOS transistor channel current ($I_1$) is equal to the cell current (I) of the amperometric sensor (S);
the second MOS drain terminal (D2) is connectable to the second reference voltage by means of a second resistor (R2); and
the electrical voltage (Vout) present at the second MOS drain terminal (D2) is representative of the cell current (I) of the amperometric sensor (S) through a nonlinear gain dependent on the value of the first resistor (R1) and on the value of the second resistor (R2), with a voltage offset present also in the case of zero cell current.

13. A system according to claim 10, wherein:
both the first (M1) and the second (M2) MOS transistors are of the P-MOS type;
the first reference voltage is a positive supply voltage (Vdd);
the second reference voltage is a ground voltage (GND);
the biasing electric potential (Vbias) is an oxidation potential (Vox); and
the electronic device is configured to read an oxidation current (I) flowing in the amperometric sensor from the working electrode (WE), at which oxidation reactions occur, to the collector electrode (CE).

14. A system according to claim 10, wherein:
both the first (M1) and the second (M2) MOS transistors are of the N-MOS type;
the first reference voltage is a ground voltage (GND);
the second reference voltage is a positive supply voltage (Vdd);
the biasing electric potential (Vbias) is a reduction potential (Vred); and
the electronic device is configured to read a reduction current (I) flowing in the amperometric sensor from the collector electrode (CE) to the working electrode (WE), at which reduction reactions occur.

15. A system according to claim 10, wherein the first resistor (R1) has a substantially zero value.

* * * * *